United States Patent
Arai

(10) Patent No.: US 7,133,666 B2
(45) Date of Patent: Nov. 7, 2006

(54) RADIO COMMUNICATION SYSTEM AND RECEPTION STATUS DISPLAY METHOD

(75) Inventor: Shunji Arai, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 347 days.

(21) Appl. No.: 10/079,845

(22) Filed: Feb. 22, 2002

(65) Prior Publication Data

US 2002/0119756 A1 Aug. 29, 2002

(30) Foreign Application Priority Data

Feb. 27, 2001 (JP) ............................. 2001-052565

(51) Int. Cl.
*H04M 11/00* (2006.01)
(52) U.S. Cl. .................. 455/421; 455/226.4; 455/67.11
(58) Field of Classification Search ................ 455/462, 455/463, 465, 554, 555, 226.1, 226.2, 226.3, 455/226.4, 67.7, 9, 67.11, 67.13, 67.14, 554.1, 455/421
See application file for complete search history.

(56) References Cited

U.S. PATENT DOCUMENTS

| 4,675,656 | A | * | 6/1987 | Narcisse | .................. | 340/539.21 |
| 5,095,500 | A | * | 3/1992 | Tayloe et al. | ............. | 379/32.01 |
| 5,138,655 | A | | 8/1992 | Takashima et al. | .......... | 379/157 |
| 5,517,551 | A | | 5/1996 | Arai | ............................ | 379/58 |
| 5,594,944 | A | | 1/1997 | Ogata et al. | ................ | 455/34.1 |
| 5,602,910 | A | | 2/1997 | Tsutsui et al. | .............. | 379/212 |
| 5,987,306 | A | * | 11/1999 | Nilsen et al. | ............. | 455/67.11 |
| 2002/0193077 | A1 | * | 12/2002 | Sakurai et al. | .............. | 455/67.7 |

FOREIGN PATENT DOCUMENTS

| JP | 9-46293 | 2/1997 |
| JP | 10-242899 | 9/1998 |

* cited by examiner

*Primary Examiner*—Matthew D. Anderson
*Assistant Examiner*—Sanh Phu
(74) *Attorney, Agent, or Firm*—Fitzpatrick, Cella, Harper & Scinto

(57) ABSTRACT

In a radio communication system, during radio connection between a base station 100 and a terminal 200, the base station 100 transmits a reception status notification request to the terminal 200. The terminal 200 receives the reception status notification request from the base station 100, then measures reception electric field intensity and error rate in the communication with the base station 100 and transmits these values as reception status information to the base station 100. The base station 100 stores the reception status information notified from the terminal 200, with linkage to a terminal number. When call origination to all the terminals has been completed, the base station 100 displays all the reception status information stored in a storage device 104, with linkage with terminal numbers, on an external display device.

12 Claims, 6 Drawing Sheets

100 BASE STATION

RADIO COMMUNICATION SYSTEM AND RECEPTION STATUS DISPLAY METHOD

FIELD OF THE INVENTION

The present invention relates to a radio communication system having a terminal and a base station and a reception status display method.

BACKGROUND OF THE INVENTION

Conventionally, in a radio communication system for digital data communication, a known method of displaying reception statuses of base station and terminal is displaying the terminal's radio reception status at the terminal, as in the case of cellular phones.

Further, Japanese Published Unexamined Patent Application No.09-046293 discloses displaying the reception status of base station on a cable-connected terminal having a display function.

Further, Japanese Published Unexamined Patent Application No.10-242899 discloses radio status check, in which, upon occurrence of fault in a system having plural base stations, the base stations communicate with each other and perform an operation test.

In the above-described conventional art, the reception status of the terminal is displayed on the terminal or the reception status of base station is displayed on the terminal. In a system where one base station can communicate with plural terminals, to obtain reception statuses of all the terminals, the respective terminals observe the reception statuses in their respective locations, at much expense in time and effort. Especially, in a system where terminals are fixed and data transmission/reception is performed with a base station by radio communication, first, a candidate position is set for installation of the base station, then the base station is temporarily installed in this position, and reception statuses are checked by all the terminals. This requires further time and effort.

If a satisfactory reception status cannot be obtained at all the terminals, the current position of the base station must be changed, and the terminals check the reception status again. This is repeated until the base station is positioned such that all the terminals can obtain a satisfactory reception status. It takes enormous time and effort to install the base station such that all the terminals can obtain a satisfactory reception status.

SUMMARY OF THE INVENTION

Accordingly, the present invention has its object to provide a radio communication system and a reception status display method which enables an operator on the base station to easily grasp the reception statuses of the terminals without undue effort.

According to the present invention, the foregoing object is attained by providing a radio communication system having a terminal and a base station, the terminal comprising a reception status detector for detecting a reception status of a signal received from the base station, and a notification unit for notifying the base station of the reception status detected by the reception status detection means, and the base station having a function of displaying the reception status transmitted from the terminal on a display unit.

According to the present invention, the foregoing object is also attained by providing a reception status display method, in a radio communication system having a terminal and a base station, for displaying a reception status of the terminal on the base station, wherein the base station detects a reception status of a signal received from the base station, and notifies the base station of the detected reception status and displays the reception status transmitted from the terminal on a display unit.

According to the present invention, the foregoing object is also attained by providing a base station having a terminal comprising a receiver for receiving a reception status of a signal received by the terminal from the base station and a display for showing the received reception status of the terminal.

According to the present invention, the foregoing object is also attained by providing a terminal included in base station, the terminal comprising a detector for detecting a reception status of a signal received from the base station and a notification unit for notifying the base station of the reception status detected by the detector in response to a request from the base station.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
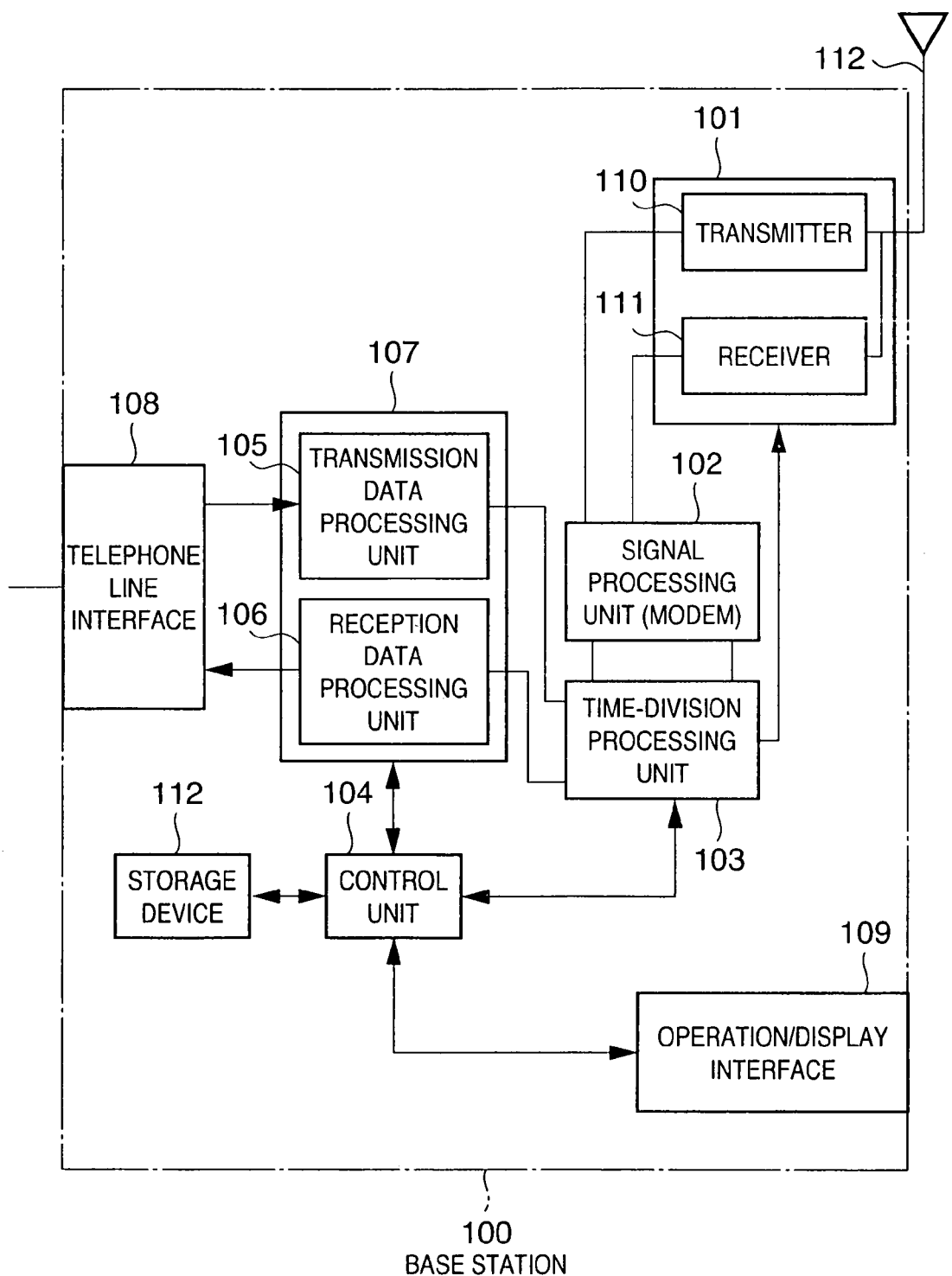
FIG. 1 is a block diagram showing the construction of a base station in a radio communication system according to a first embodiment of the present invention.
Figure 2:
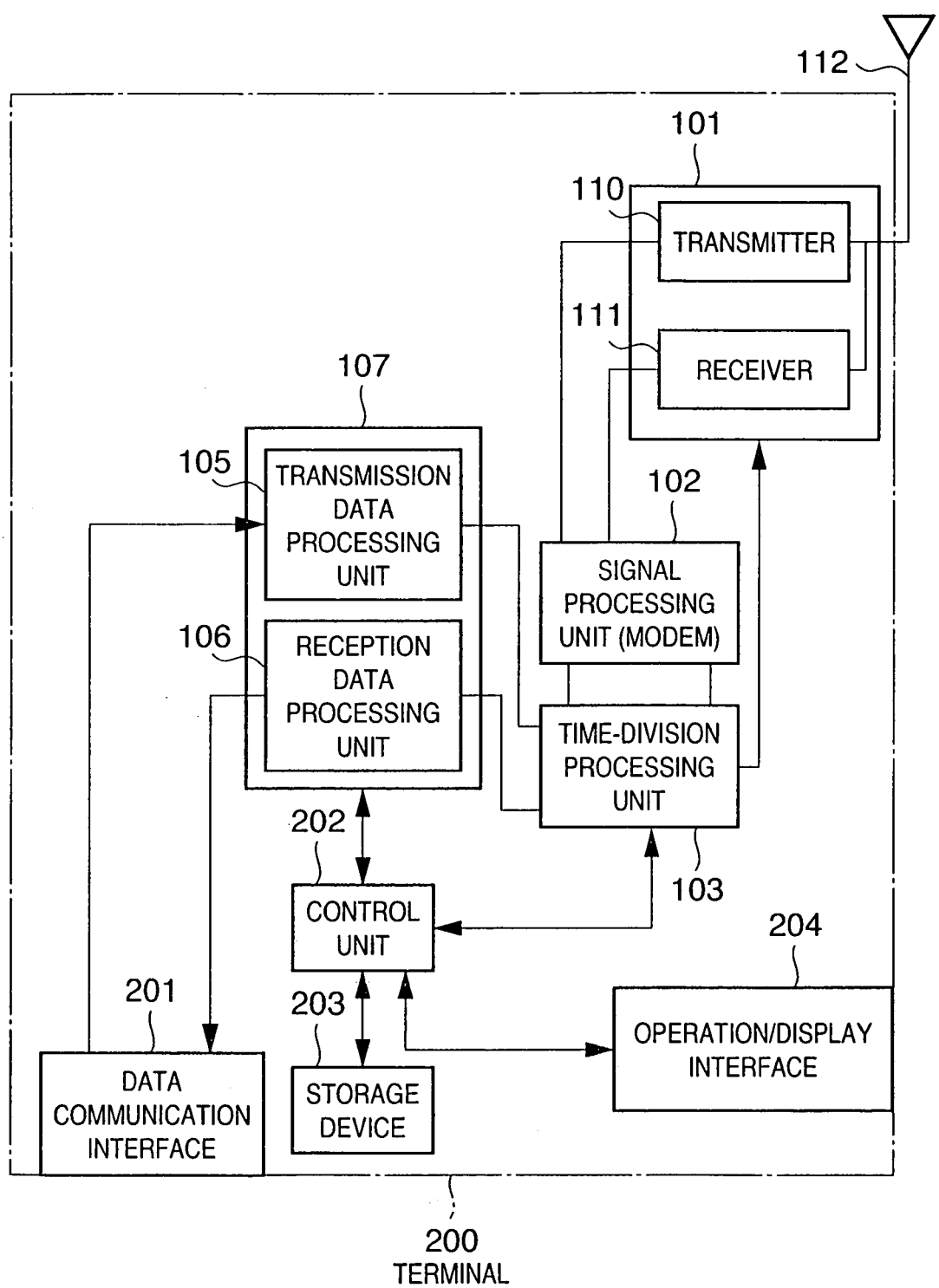
FIG. 2 is a block diagram showing the construction of a terminal capable of radio communication with the base station in FIG. 1.

A description will now be given of a first embodiment of the present invention with reference to FIGS. 1 and 2. FIG. 1 is a block diagram showing the construction of a base station of a radio communication system according to a first embodiment of the present invention. FIG. 2 is a block diagram showing the construction of a terminal capable of radio communication with the base station in FIG. 1. The present invention is applicable to a digital cordless-base system such as PHS, CT-2 and DECT. In the present embodiment, the system performs data communication by PHS or digital cordless phone system for time-division multiplex digital radio communication.

The radio communication system has a base station 100 as shown in FIG. 1 and plural terminals 200 as shown in FIG. 2. As shown in FIG. 1, the base station 100 has a radio interface 101 for radio transmission/reception, a signal processing unit (modem) 102, a time-division processing unit 103, a data processing unit 107, a telephone line interface 108, a control unit 104, an operation/display interface 109, and a storage device 112. The storage device 112 is an information storage device such as a ROM, a RAM or a hard disk.

The radio interface 101 has a transmitter 110, a receiver 111 and an antenna 112. A signal received by the receiver 111 of the radio interface 101 is detected and converted into a digital signal by the signal processing unit 102. Further, the signal processing unit 102 modulates a digital signal from the time-division processing unit 103 for radio transmission. The time-division processing unit 103 converts data from the telephone line interface 108 into a data packet for time-division multiplex communication and sends the packet to the signal processing unit 102, and separates a received packet into control information and communication data and sends them to the data processing unit 107.

The data processing unit 107 has a transmission data processor 105 and a reception data processor 106. The transmission data processor 105 adds a sequence number and an error correction bit to data to be transmitted. The reception data processor 106 performs processing to remove an error correction bit and a sequence number from data from the time-division processing unit 103 upon data communication. The telephone line interface 108 accommodates a circuit such as a public switched telephone network (PSTN).

The control unit 104 performs control on the entire base station including transmission/reception data processing. Further, the control unit 104 controls processing to enter a measurement mode of displaying a reception status of the terminal 200 and displays information on the reception status received from the terminal 200. The operation/display interface 109 is removably connected to an external operation unit (not shown) for inputting an instruction to enter the measurement mode of displaying the reception status, and to an external display for displaying information on the reception status received from the terminal 200. A program, information and the like necessary for control of the base station 100 itself are stored in the storage device 112. Further, the information on the reception status of the terminal 200 is temporarily stored in the storage device 112. Further, terminal numbers of the respective terminals 200, each linked to a registration number n (=1, . . . ), are registered in the storage device 112.

As shown in FIG. 2, the terminal 200 has the radio interface 101 for radio transmission/reception, the signal processing unit (modem) 102, the time-division processing unit 103, the data processing unit 107, a data communication interface 201, a control unit 202, a storage device 203, and an operation/display interface 204. Note that constituent elements having the same functions of those of the base station 100 have the same reference numerals and the explanations of the elements will be omitted. The data communication interface 201 is an interface for connection with a device on the other end of data communication. The control unit 202 controls the entire terminal 200, detects the reception status of the terminal 200 itself, and performs control to notify the base station 100 of the detected reception status. A program and information necessary for control of the terminal 200 itself are stored in the storage device 203. The operation/display interface 204 is removably connected to the external operation unit (not shown) for various operations, and to external display for displaying various information.

Next, the operations of the base station 100 and the terminal 200 in reception status display processing according to the present embodiment will be described with reference to FIG. 3.

Figure 3:
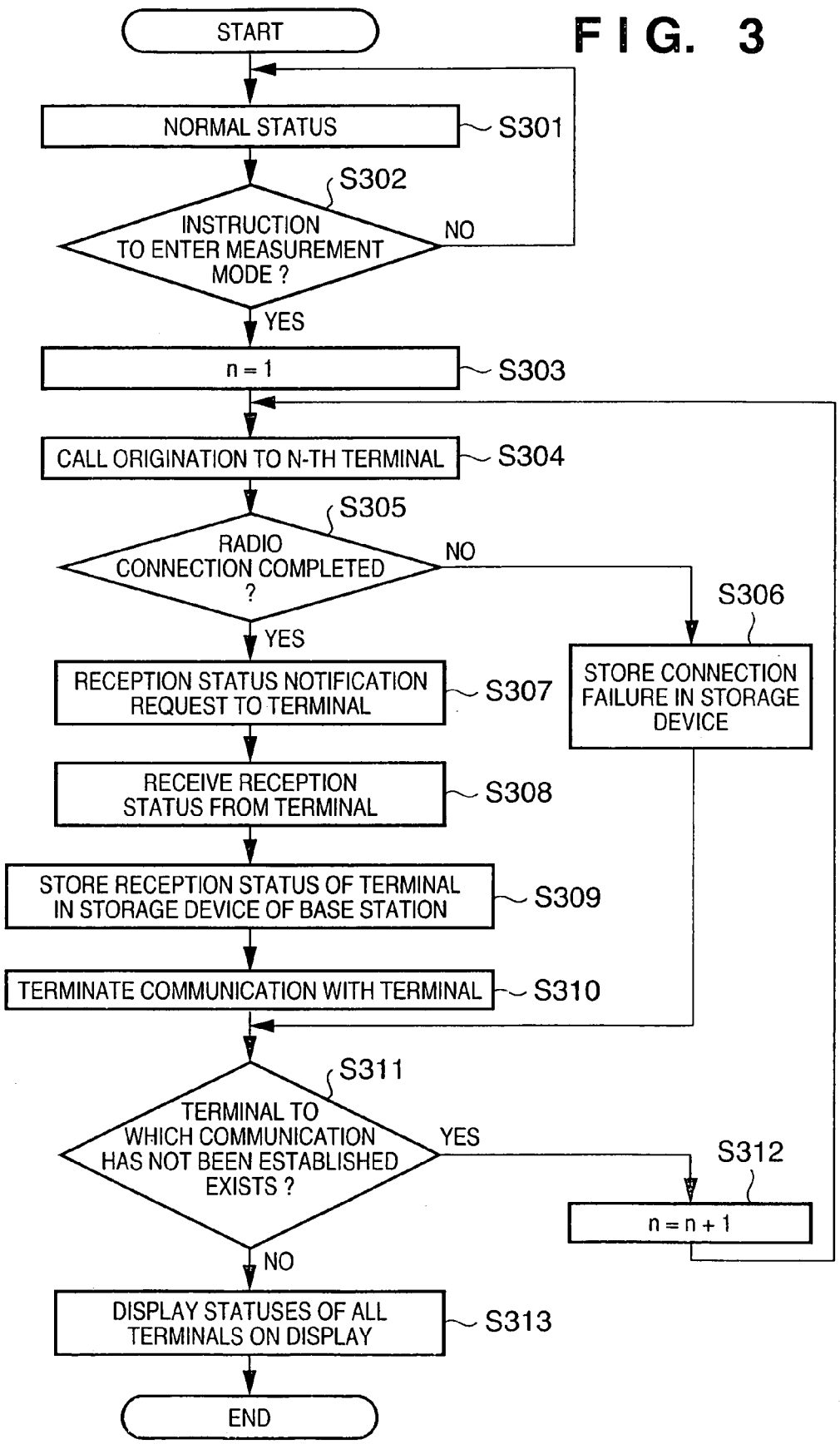
FIG. 3 is a flowchart showing the operation of a base station 100 in reception status detection processing for each terminal 200.

FIG. 3 is a flowchart showing the operation of the base station 100 in the reception status display processing. The operation according to the flowchart of the figure is controlled by the control unit 104.

As shown in FIG. 3, in the base station 100, a normal status is maintained at step S301, and at step S302, the control unit 104 monitors whether or not an instruction to enter the measurement mode has been issued from the external operation unit connected to the operation/display interface 109. If it is determined that an instruction to enter the measurement mode has been issued from the external operation unit, then the process proceeds to step S303, at which the registration number n of the registered terminal is initialized to "1".

Next, at step S304, call origination is made to the terminal having the registration number n, to establish connection with the terminal. Next, at step S305, it is determined whether or not radio connection with the terminal has been completed. If connection cannot be established with the terminal because the power of the terminal is not ON or the terminal is out of coverage, it is determined that the radio connection with the terminal has not been completed. At step S306, reception status information indicating the failure of connection with the terminal having the registration number n is stored in the storage device 112. Then the process proceeds to step S311 to be described later.

On the other hand, if the radio connection with the terminal has been completed, the process proceeds to step S307, at which a reception status notification request is transmitted to the terminal. The reception status notification request is a command to request information from the terminal on received signal strength and error rate detected at the terminal.

The terminal receives the reception status notification request from the base station 100, and in response thereto, measures the received signal strength and error rate in the communication with the base station 100. Then the terminal transmits these values as reception status information to the base station 100 via the transmission data processor 105.

Next, at step S308, the base station stands by to receive the reception status information transmitted from the terminal, and when the reception status information is received, the process proceeds to step S309, at which the reception status information is stored, with linkage to the terminal number, in the storage device 104. Next, at step S310, communication with the terminal is terminated and the process proceeds to step S311, at which it is determined whether or not a terminal with which communication has not been established exists. If a terminal with which communication has not been established exists, the process proceeds to step S312, at which the registration number n is incremented by one, and the process returns to step S304, at which call origination is made to the next terminal.

On the other hand, if there is no terminal with which communication has not been established, i.e., call origination has been made to all the terminals, the process proceeds to step S313, at which all the reception status information stored in the storage device 104, each linked to a corresponding terminal number, are displayed on the external display connected to the operation/display interface 109. The contents displayed on the display include the terminal number(s) with which the radio connection has not been established, in order to indicate that there exists such terminal.

The display may show the terminal number(s) in order of the terminal number or in accordance with connection conditions. The operation unit can operate the display to change displayed contents.

Furthermore, the display may also show terminals which do not need their settings repositioned, separately from terminals which are unconnected, or connected but must be repositioned because of poor received signal strength and error rate compared with a predetermined reference level.

In this manner, in the present embodiment, when each terminal 200 receives a signal from the base station 100, it detects the reception status of the signal, and notifies the base station 100 of the detected reception status. Then the base station 100 displays the reception status transmitted from the terminal on the external display. This enables an operator on the base station 100 to easily grasp the reception statuses of all the terminals 200 without enormous time and effort. Further, if the base station is programmed to perform call origination to all the registered terminals, transmit the reception status notification request, and receive the reception status information, automatically, and in sequence, repeatedly through all the terminals, then the reception statuses of the respective terminals can be more easily obtained. Particularly, in a radio system where the terminals are fixed, the time and effort needed to determine the installation position of the base station 100 is determined can be greatly reduced.

[Second Embodiment]

Next, a second embodiment of the present invention will be described with reference to FIG. 4.

Figure 4:
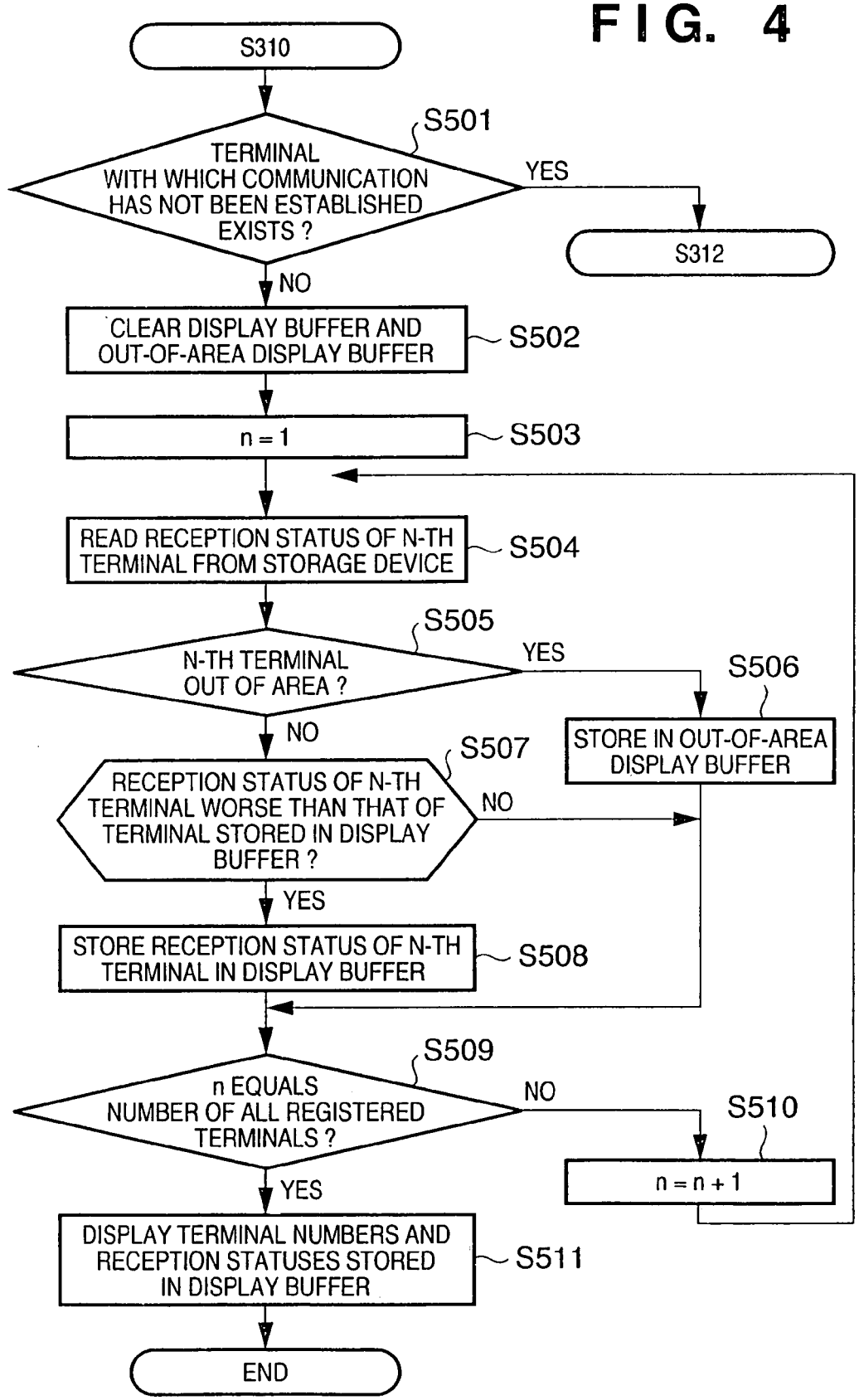
FIG. 4 is a flowchart showing the operation on the base station in the reception status detection processing for each terminal in the radio communication system according to a second embodiment of the present invention.

FIG. 4 is a flowchart showing the operation on the base station in the reception status display process in the radio communication system according to the second embodiment. The present embodiment has the same configuration as that of the above-described first embodiment, so an explanation of the configuration will be omitted. Further, in the following description, the same reference numerals as those used in the first embodiment will be used.

In the present embodiment, the processing is performed by the same procedure as that of the first embodiment until the call origination from the base station 100 to all the terminals 200 has been completed. When the call origination to all the terminals 200 has been completed, the base station 100 displays a terminal number with the worst received signal strength and error rate. Further, if there is a terminal with which radio connection has not been established, the terminal number of the terminal is displayed.

The operation of the base station 100 will be described with reference to FIG. 4.

As shown in FIG. 4, in the present embodiment, when the base station 100 has terminated the communication with the terminal at step S310 in FIG. 3, the process proceeds to step S501, at which it is determined whether or not a terminal with which communication has not been established exists. If a terminal with which communication has not been established exists, the process proceeds to step S312 in FIG. 3. When there is no terminal with which communication has not been established, i.e., the call origination to all the terminals has been completed, the process proceeds to step S502.

At step S502, a display buffer and an out-of-area display buffer, retained in the storage device 112 for displaying out-of-area terminals, is cleared. At step S503, the registration number n is initialized to "1", and at step S504, the reception status information of the terminal having the registration number n is read from the storage device 112. The process proceeds to step S505, at which it is determined whether or not the read reception status information of the terminal having the registration number n is out-of-area status information (information indicating that radio connection has not been established). If the reception status information of the terminal is the out-of-area status information, the process proceeds to step S506, at which the terminal number of the terminal having the registration number n is stored in the out-of-area display buffer of the storage device 112, and the process proceeds to step S509. On the other hand, if the read reception status information of the terminal having the registration number n is not out-of-area status information, the process proceeds to step S507.

At step S507, the read reception status information of the terminal having the registration number n is compared with the reception status information already stored in a display buffer, and it is determined, by a process of comparison whether or not the reception status of the terminal having the registration number n is worse than the reception status of the terminal already stored in the display buffer. If the reception status of the terminal having the registration number n is worse than the reception status of the terminal already stored in the display buffer, then the process proceeds to step S508, at which the reception status information in the display buffer of the storage device 112 is rewritten with the read reception status of the terminal having the registration number n. Then the process proceeds to step S509. On the other hand, if the read reception status of the terminal having the registration number n is better than the reception status of the terminal already stored in the display buffer, then the process skips the above-described step S508, and proceeds to step S509. At step S507, if there is no terminal reception status stored in the display buffer, i.e., n=1, the process proceeds to step S508.

At step S509, it is determined whether or not the registration number n corresponds with the number of actually registered terminals. If the registration number n does not correspond with the number of actually registered terminals, then it is determined that the call origination to all the terminals has not been completed. The process proceeds to step S510, at which the registration number n is incremented by one, and the process returns to step S504, at which the reception status information of the next terminal is read. On the other hand, if the registration number n corresponds with the number of actually registered terminals, it is determined that the call origination to all the terminals has been completed. The process proceeds to step S511, at which the terminal numbers stored in the display buffer of the storage device 112 and the reception status information are read, and displayed on the external display connected to the operation/display interface 109. Further, out-of-area display is made by reading and displaying the number(s) of terminal(s) stored in the out-of-area display buffer.

[Third Embodiment]

Figure 5:
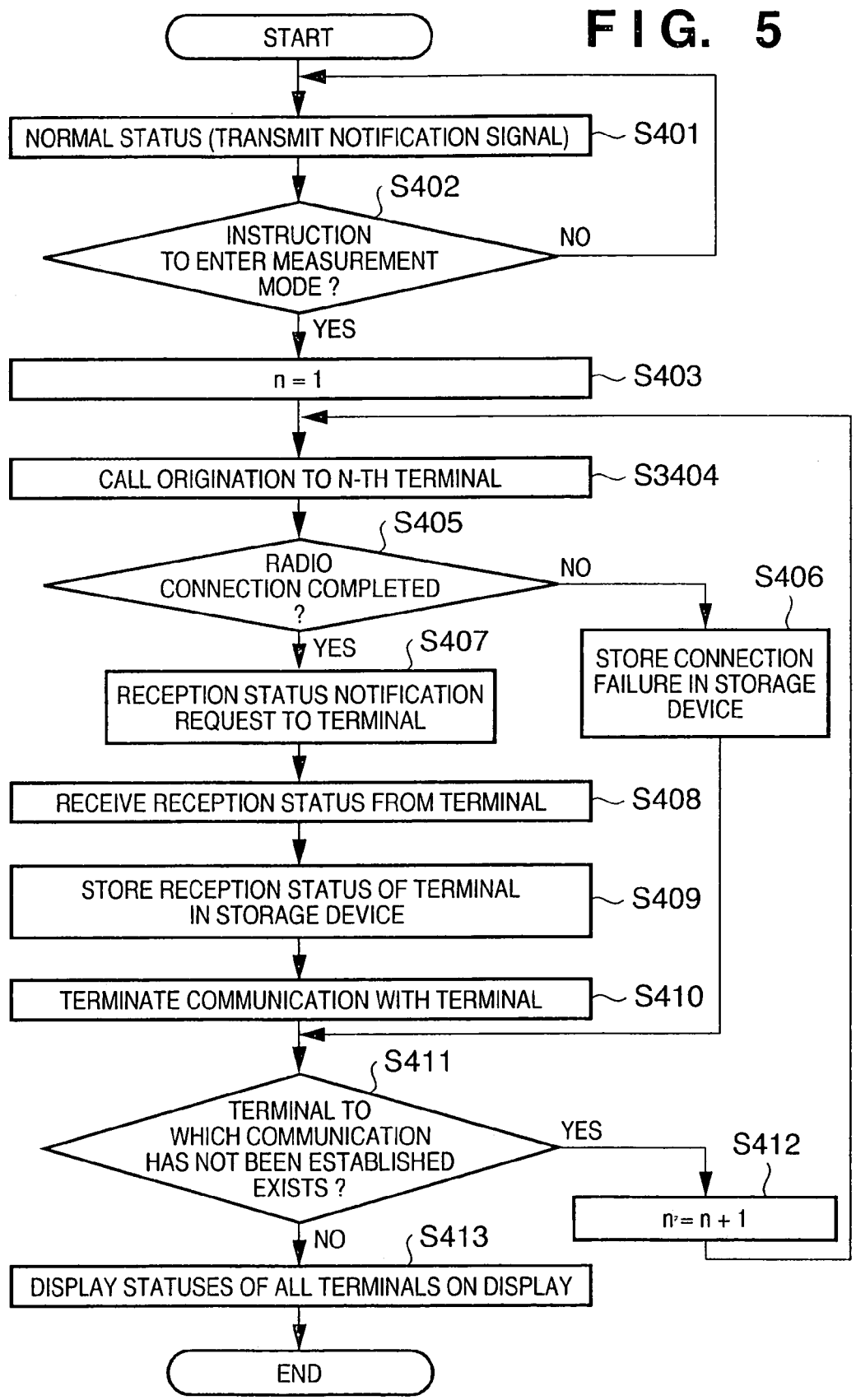
FIG. 5 is a flowchart showing the operation on the base station in the reception status detection processing for each terminal in the radio communication system according to a third embodiment of the present invention.
Figure 6:
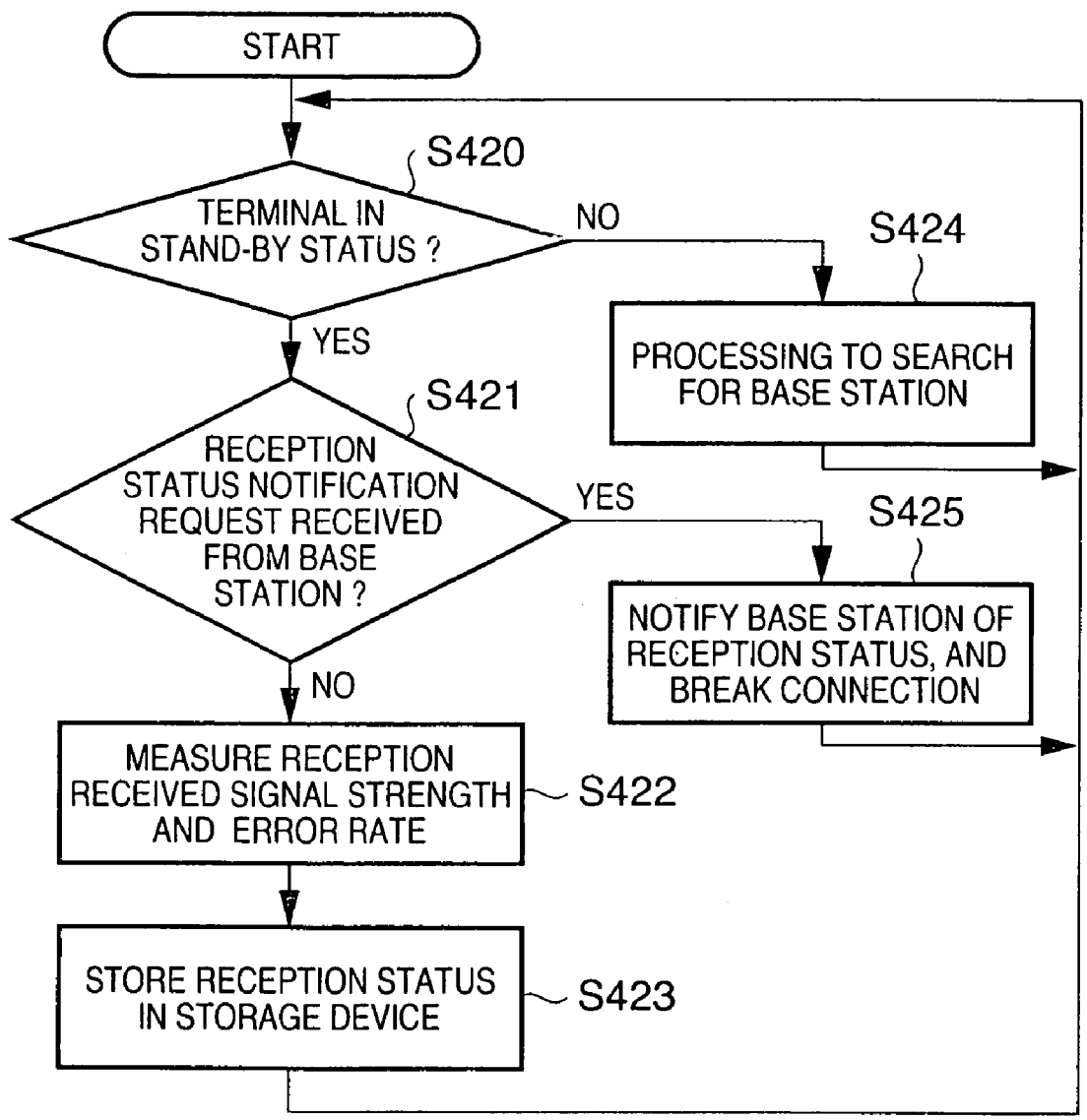
FIG. 6 is flowchart showing the operation on the terminal in the reception status detection processing for each terminal in the radio communication system according to the third embodiment of the present invention.

Next, a third embodiment of the present invention will be described with reference to FIGS. 5 and 6. FIG. 5 is a flowchart showing the operation on the base station in the reception status display processing in the radio communication system according to the third embodiment. FIG. 6 is a flowchart showing the operation on the terminal in the reception status display processing in the radio system according to the third embodiment.

In the above-described first and second embodiments, upon communication between the base station 100 and the terminal 200, the received signal strength and error rate in the communication status are displayed as reception status information. In a radio communication system utilizing a digital cordless phone system, the base station 100 always transmits a notification signal on a control channel and the terminal 200 receives the signal. The notification signal is a significant signal for radio channel connection between the base station 100 and the terminal 200, and it is important to obtain the status of the signal. In the present embodiment, the terminal 200 detects the reception status of the notification signal and notifies the base station 100 of the reception status.

More particularly, as shown in FIG. 5, in the base station 100, the normal status is maintained at step S401. In the normal status, the notification signal is transmitted. Next, at step S402, the control unit 104 monitors whether or not an instruction to enter the measurement mode has been issued from the external operation unit connected to the operation/display interface 109. If it is determined that an instruction to enter the measurement mode has been issued from the external operation unit, then the process proceeds to step S403, at which the registration number n of the registered terminal is initialized to "1".

Next, at step S404, call origination is made to the terminal of the registration number n to establish connection with the terminal. Next, at step S405, it is determined whether or not radio connection with the terminal has been completed. If connection cannot be established with the terminal because the power of the terminal is not ON or the terminal is out of coverage, then it is determined that the radio connection with the terminal has not been completed. At step S406, information indicating the failure of connection with the terminal having the registration number n (out-of-area information) is stored in the storage device 112. Then the process proceeds to step S411 to be described later.

On the other hand, if the radio connection with the terminal has been completed, the process proceeds to step S407, at which the reception status notification request is transmitted to the terminal. The reception status notification request is a command to request information on the received signal strength of the notification signal and error rate of the notification signal detected on the terminal from the terminal.

The terminal receives the reception status notification request from the base station 100, then in response to the reception status notification request, transmits the received signal strength of the notification signal and error rate of the notification signal as reception status information to the base station 100 via the transmission data processor 105. The operation of the terminal will be described in more detail later.

Next, at step S408, the base station stands by for the reception status information transmitted from the terminal, and when the reception status information is received, the process proceeds to step S409, at which the reception status information is stored, with linkage to the terminal number, in the storage device 104. Next, at step S410, communication with the terminal is terminated. Then the process proceeds to step S411, at which it is determined whether or not a terminal with which communication has not been established exists. If a terminal with which communication has not been established exists, then the process proceeds to step S412, at which the registration number n is incremented by one, and the process returns to step S404, at which call origination is made to the next terminal.

On the other hand, if there is no terminal with which communication has not been established, i.e., call origination has been established to all the terminals, the process proceeds to step S413, at which all the reception status information stored in the storage device 104, each linked to a corresponding terminal number, are displayed on the external display connected to the operation/display interface 109. The contents displayed on the display include the terminal number(s) with which the radio connection has not been established, in order to indicate that there exists such terminal.

The display may show the terminal number(s) in order of the terminal number or in accordance with connection conditions. The operation unit can operate the display to change displayed contents.

Furthermore, the display may also show terminals which do not need their settings repositioned, separately from terminals which are unconnected, or connected but must be repositioned because of poor received signal strength and error rate compared with a predetermined reference level.

Next, the operation of the terminal 200 will be described with reference to FIG. 6.

As long as the terminal 200 can receive radio from the base station 100, it enters a reception stand-by status to periodically receive the notification signal transmitted from the base station 100 in the normal status. As shown in FIG. 6, in the terminal 200, at step S420, it is determined whether or not the terminal has entered the stand-by status. If the radio is not received and the terminal cannot enter the stand-by status, then the process proceeds to step S424, at which processing to search for the base station 100 is performed. Then the process returns to step S420, at which it is again determined whether or not the terminal has entered the stand-by status.

On the other hand, if it is determined that the terminal has entered the stand-by status, i.e., the notification signal transmitted from the base station 100 in the normal status is periodically received, the process proceeds to step S421, at which it is determined whether or not the reception status notification request has been received from the base station 100. If the reception status notification request from the base station 100 has not been received, the process proceeds to step S422, at which the received signal strength and error rate for the notification signal received in the stand-by status are measured. The measured received signal strength and error rate are stored as the reception status information in the storage device 203. Note that already-stored reception status information in the storage device 203 is updated with the new information. Then the process returns to step S420.

If it is determined at step S421 that the reception status notification request from the base station 100 has been received, the process proceeds to step S425, at which the reception status information is read from the storage device 203 and notified to the base station 100 via the transmission data processor 105. Then, disconnection is made, and the process returns to step S420.

Note that in the present embodiment, as in the case of the above-described first embodiment, the base station 100 displays reception statuses of all the terminals, however, it may be arranged such that the base station displays the terminal number of terminal having the worst received signal strength and error rate and its reception status among all the terminals, as in the case of the second embodiment. In this case, from step S410 in FIG. 5, the operation is performed in accordance with the operation flow of FIG. 4, thereby the terminal number of the terminal having the worst received signal strength and error rate and its reception status can be displayed.

Further, in the above-described first or third embodiment, the reception statuses are displayed after the completion of communication with all the terminals, however, it may be arranged such that, upon completion of communication with each terminal, the reception status of terminal is displayed on the external display. In this case, a similar advantage can be obtained.

As described above, according to the present invention, the terminal notifies the base station of its reception status, and the base station displays the reception status notified from the terminal. Accordingly, in a radio communication system capable of communication with plural terminals, the reception statuses of the terminals can be easily grasped on the base station without enormous time and effort. Further, in a system using plural fixed terminals, as the reception statuses of all the terminals can be easily grasped on the base station, the time and effort until the installation position of the base station is determined can be greatly reduced.

OTHER EMBODIMENTS

Further, the object of the present invention can also be achieved by providing a storage medium storing program codes for performing the aforesaid processes to a computer system or apparatus (e.g., a personal computer or personal digital assistant), reading the program codes, by a CPU or MPU of the computer system or apparatus, from the storage medium, then executing the program.

In this case, the program codes read from the storage medium realize the functions according to the described embodiments and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above described embodiments are realized by executing the program codes which are read by a computer, the present invention includes a case where an OS (operating system) or the like working on the computer performs a part or entire processes in accordance with designations of the program codes and realizes functions according to the above described embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above described embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore, to appraise the public of the scope of the present invention, the following claims are made.

What is claimed is:

1. A radio communication system having a plurality of terminals and a base station,
   wherein each of the terminals comprises:
   a reception status detector for detecting a reception status of a signal received from said base station; and
   a notification unit for notifying said base station of the reception status detected by said reception status detector, and
   wherein the base station comprises:
   a management unit for managing the terminals based on identification information to identify each terminal;
   a connection unit for trying to wirelessly connect to the terminals managed by said management unit;
   a collector for collecting the reception statuses of the terminals notified from said notification unit of the terminal that could be connected by said connection unit;
   an out-of-area display buffer for storing identification information of terminals that could not be connected by said connection unit;
   a display buffer for storing identification information and reception status of a terminal that has the worst reception status among reception statuses collected by said collector; and
   a display control unit for displaying on a display unit, identification information stored in said out-of-area display buffer and identification information and the reception status stored in said display buffer.

2. The radio communication system according to claim 1, wherein said terminals detect at least one of a received signal strength and a reception data error rate, as the reception status of the signal received from said base station.

3. The radio communication system according to claim 1, wherein the signal received from said base station is a signal obtained upon radio connection between said base station and said terminals.

4. The radio communication system according to claim 1, wherein:
   said base station issues a reception status notification request to request the terminal to send the reception status; and
   when said terminals receive the reception status notification request from said base station, said notification unit of said terminals notifies said base station of the reception status in response to the reception status notification request.

5. The radio communication system according to claim 1, wherein:
   the signal received from said base station is a notification signal which is always transmitted from said base station;
   said terminals have a storage device for storing the reception status; and
   said reception status detector detects the reception status upon reception of the notification signal and notifies said base station of the reception status.

6. The radio communication system according to claim 1, wherein said base station has an interface for connection with said display unit.

7. The radio communication system according to claim 1, wherein a system of communication between said base station and said terminals is a digital cordless phone system.

8. A reception status display method, in a radio communication system having a plurality of terminals and a base station, for displaying a reception status of said terminals on said base station, wherein said base station:
- manages the terminals based on identification information to identify each terminal;
- tries to wirelessly connect to the managed terminals;
- collects the reception statuses of terminals notified from a notification unit of the terminal that could be connected by said base station;
- stores identification information of terminals that could not be connected by said base station in an out-of-area display buffer;
- stores identification information and reception status of a terminal that has the worst reception status among the collected reception statuses, in a display buffer; and
- displays identification information stored in said out-of-area display buffer and identification information and the reception status stored in said display buffer.

9. A communication apparatus comprising:
- a manager configured to manage a plurality of terminals based on identification information to identify each terminal;
- a connection unit configured to try to wirelessly connect to the terminals managed by said manager;
- a collector configured to collect reception statuses of the terminals notified from a notification unit of the terminal that could be connected by said connection unit;
- an out-of-area display buffer configured to store identification information of terminals that could not be connected by said connection unit;
- a display buffer configured to store identification information and reception status of a terminal that has the worst reception status among reception statuses collected by said collector; and
- a display controller configured to display on a display unit, identification information stored in said out-of-area display buffer and identification information and the reception status stored in said display memory buffer.

10. A communication apparatus according to claim 9, wherein said display controller displays an identification information about terminals that could and could not communicate, and displays the reception status, on the display unit.

11. The communication apparatus according to claim 9, wherein said collector collects at least one of a received signal strength and a reception data error rate, as the reception status of the signal received from said base station.

12. A method for displaying a reception status of signals received by a plurality of terminals at a base station, said method comprising steps of:
- managing the plurality of the terminals based on identification information to identify each terminal;
- trying to wirelessly connect to the managed terminals;
- collecting the reception statuses of the plurality of the terminals notified from a notification unit of each terminal that could be connected by said base station;
- storing identification information of terminals that could not be connected by said base station in an out-of-area display buffer;
- storing identification information and reception status of a terminal that has the worst reception status among the collected reception statuses, in a display buffer; and
- displaying the identification information stored in said out-of-area display buffer and identification information and the reception status stored in said display buffer.

* * * * *

UNITED STATES PATENT AND TRADEMARK OFFICE
CERTIFICATE OF CORRECTION

PATENT NO. : 7,133,666 B2 Page 1 of 1
APPLICATION NO. : 10/079845
DATED : November 7, 2006
INVENTOR(S) : Arai It is certified that error appears in the above-identified patent and that said Letters Patent is hereby corrected as shown below:

COLUMN 8:
Line 15, "are" should read -- is --;
Line 32, "radio" should read -- a radio signal --; and
Line 38, "radio" should read -- radio signal --.

COLUMN 9:
Line 47, "above described" should read -- above-described --;
Line 52, "above described" should read -- above-described --; and
Line 63, "above described" should read -- above-described --.

Signed and Sealed this

Fourth Day of March, 2008

JON W. DUDAS
*Director of the United States Patent and Trademark Office*